(12) United States Patent  
Cayer

(10) Patent No.: US 7,344,204 B2
(45) Date of Patent: Mar. 18, 2008

(54) AIR BRAKE SAFETY DEVICE

(76) Inventor: Gerry Cayer, 5 Fraser St., P.O. Box 118, St. Andrews West, Ontario (CA) K0C 2A0

( * ) Notice: Subject to any disclaimer, the term of this patent is extended or adjusted under 35 U.S.C. 154(b) by 0 days.

(21) Appl. No.: 11/592,635

(22) Filed: Nov. 3, 2006

(65) Prior Publication Data

US 2007/0102997 A1    May 10, 2007

Related U.S. Application Data

(60) Provisional application No. 60/733,762, filed on Nov. 7, 2005.

(51) Int. Cl.
*B60T 7/20* (2006.01)
(52) U.S. Cl. ..................................... 303/123
(58) Field of Classification Search .......... 137/625.47; 303/123, 89, 122.15, 127, 191, 50, 56
See application file for complete search history.

(56) References Cited

U.S. PATENT DOCUMENTS

| | | | | |
|---|---|---|---|---|
| 3,973,805 A | * | 8/1976 | Stevenson et al. .............. 303/9 |
| 3,998,495 A | | 12/1976 | Maxwell et al. |
| 4,312,372 A | * | 1/1982 | Amos et al. ................. 137/266 |
| 4,351,354 A | * | 9/1982 | Hilterhaus et al. ........... 137/240 |
| 4,441,524 A | * | 4/1984 | Mese ..................... 137/625.47 |
| 4,552,334 A | * | 11/1985 | Tomiyama et al. ........... 137/240 |
| 4,721,192 A | | 1/1988 | Cano et al. |
| 5,145,240 A | * | 9/1992 | Harless et al. ................. 303/89 |
| 5,747,886 A | * | 5/1998 | Parr et al. ................... 307/10.2 |
| 5,787,928 A | * | 8/1998 | Allen et al. ............. 137/625.43 |
| 5,893,392 A | * | 4/1999 | Spies et al. ............. 137/625.47 |
| 6,196,266 B1 | * | 3/2001 | Breda ..................... 137/625.11 |
| 6,308,739 B1 | * | 10/2001 | Barbuto et al. ......... 137/625.19 |
| 6,367,888 B1 | | 4/2002 | Kee et al. |
| 6,634,721 B2 | * | 10/2003 | Holt ............................ 303/89 |

* cited by examiner

*Primary Examiner*—Robert A. Siconolfi
*Assistant Examiner*—James K Hsiao

(57) ABSTRACT

The invention is particularly directed toward a safety device for a truck trailer having a valve, the valve having a casing rotatably mounting a valve spool therein. The casing has an air inlet, an air outlet, a vent outlet, and an alarm outlet. The spool has a passageway therethrough. The air inlet connects to connectable to an air compressor. The air outlet connects to the brakes of the trailer. The vent leads to the atmosphere. The alarm outlet leads to an alarm. The valve spool is selectivley rotatable within the casing to one of: a drive position where the valve connects the air inlet to the air outlet and blocks the vent and alarm outlets; a locked position where the valve connects the air outlet to the vent outlet and blocks the air inlet and alarm outlet; and an alarm position where the valve connects the air air inlet to the alarm outlet and blocks the air and vent outlets.

4 Claims, 1 Drawing Sheet

AIR BRAKE SAFETY DEVICE

BACKGROUND OF THE INVENTION

1. Technical Field

This invention relates to an air brake safety device for truck trailers. The invention also relates to a truck trailer equipped with the safety device.

2. Background Art

Air brake safety devices are used in truck trailers to protect workers loading and unloading the trailers. The devices prevent compressed air from a tractor from unlocking the air brakes on the trailer to allow the trailer to be driven away by the tractor while the workers are still working the trailer. The safety devices usually employ two-way valves which, in one position, allow air from the compressor on the tractor to reach the brakes on the trailer to unlock the brakes and allow the trailer to be moved. In a second position, the device prevents all the air from the compressor from reaching the brakes and instead diverts some of the air from the compressor to the atmosphere. In this position the trailer cannot be moved. Usually the air is diverted through an alarm such as a horn or whistle to the atmosphere to alert people working in the trailer that an attempt is being made to move it. The alarm can also be used as an anti-theft device to alert people that an attempt is being made to unlock the brakes in an attempt to steal the trailer when it is loaded and parked. Air from the compressor is still passed to the brakes but since most of the air is diverted to the atmosphere, the brakes cannot be unlocked. Examples of such safety devices are shown in U.S. Pat. Nos. 5,145,240 and 5,747,886 by way of example.

These known safety devices have some disadvantages however. Normally, the devices allow some air to reach the trailer brakes even while diverting most of the air to the atmosphere. If the outlet to the atmosphere, for any reason becomes blocked, the air pressure to the brakes may become sufficient to operate the brakes thus either endangering the people working at the back of the trailer, or allowing the trailer to be stolen. Some of the devices also continually operate an alarm while diverting most of the air to the atmosphere which can be annoying to the workers. The known safety devices are also usually quite complicated in construction and thus relatively expensive to build and install. The devices can also be somewhat difficult to operate depending on the location of the valve.

SUMMARY OF THE INVENTION

It is the purpose of the present invention to provide a safety device for a truck trailer that, in one mode of operation, can allow the brakes to work normally. In another mode of operation the device can be simply operated to positively block all air flow to the brakes when disabling the brake system while loading or unloading the trailer. The safety device, in yet another mode of operation, can be used as an anti-theft alarm while positively blocking all air flow to the air brakes. It is another purpose of the present invention to provide a safety device that is relatively simple in construction, easy to install and easy to operate. It is a further purpose of the present invention to provide a truck trailer with the safety device, the device positioned in a secure place on the trailer where it can be easily operated.

In accordance with the present invention, a safety device is provided having a valve that in a first position can operate the trailer brakes; in a second position, can prevent operation of the brakes; and in a third position can operate an alarm device if an attempt is made to move the trailer. The device of the present invention is easily incorporated into the standard truck-trailer braking system with only minor modifications; is located within the trailer for security and safety reasons; and is located in a position within the trailer to be easily operated by the people loading/unloading the trailer. The valve of the device is mounted in the trailer brake line leading from the compressor to the trailer brakes within the trailer. The valve is preferably located on an inside wall of the trailer adjacent the back door of the trailer to be easily accessible by the workers loading/unloading the trailer and yet out of the way.

In the first position of the valve, it connects the first section of the brake line coming from the compressor to the second section of brake line going to the brakes so that the brakes are unlocked and can be operated normally. Thus a driver can move a trailer to a loading dock for loading/unloading. The valve, in its second position, blocks the section of brake line coming from the compressor, and connects the section of the brake line going to the brakes to a vent line leading from the valve to vent the brakes and to lock the brakes to prevent their normal operation. Thus a driver cannot inadvertently move the trailer with a tractor while workers are loading/unloading the trailer at the loading dock. Once loading/unloading is finished the workers will move the valve to the first position allowing air to reach the brakes so the driver can now move the trailer. The trailer can be parked, with or without the tractor, when loaded, either at the loading dock or away from it and the valve can be moved to its third position where the brake line section from the compressor is directed through an alarm in an alarm line leading from the valve. The brake line section leading to the brakes is closed. If a thief tries to steal the trailer connecting a tractor to the trailer and the compressor in the tractor to the brake line, the alarm will sound.

The invention is particularly directed toward a safety device for a truck trailer having a valve, the valve having a casing rotatably mounting a valve spool therein. The casing has an air inlet, an air outlet and a vent outlet. The spool has a passageway therethrough. The air inlet is connectable to a first brake line section from an air compressor. The air outlet is connectable to a second brake line section leading to brakes on the trailer and the vent outlet leads to the atmosphere. The valve spool is rotatable within the casing between a drive position where the valve connects the air inlet to the air outlet and blocks the vent outlet and a locked position where the valve connects the air outlet to the vent outlet and blocks the air inlet.

DETAILED DESCRIPTION OF THE INVENTION

Figure 1:
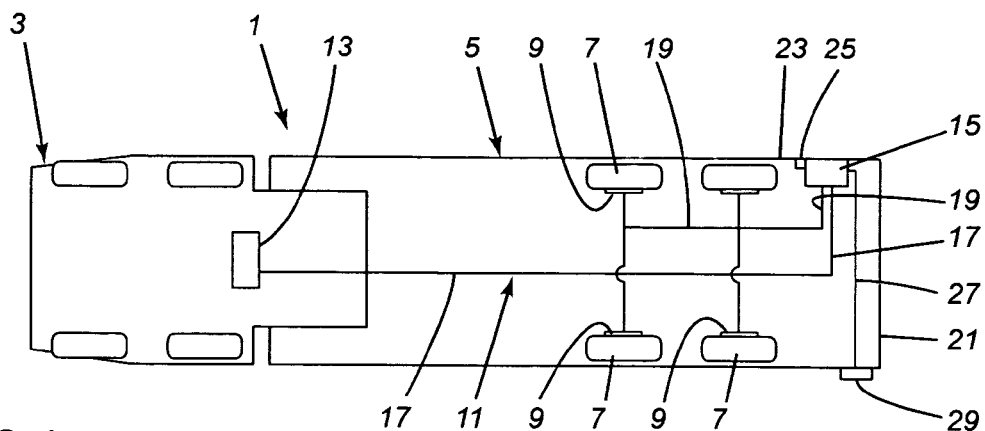
FIG. 1 is a schematic view of the trailer showing the safety device installed within the brake system inside the trailer.

A truck 1, as shown in FIG. 1, has a cab or tractor 3 pulling a trailer 5. The trailer 5 has at least rear wheels 7 with brakes 9 thereon. The trailer 5 has a brake line 11 which connects an air compressor 13 on the cab 3 to the brakes 9. A safety device 15 is inserted into the brake line 11 with a first brake line section 17 connecting the safety device 15 to the compressor 13 and a second brake line section 19 connecting the safety device 15 to the brakes 9.

The safety device 15 is usually adapted to be mounted within the truck trailer 5, usually near the back door 21 of the trailer, and in a position, usually up high on a side wall 23 of the trailer, where it is easily accessible to a worker loading or unloading the trailer but still normally out of the way. An air vent line 25 leads from the safety device 15 to the atmosphere and an alarm line 27 leads from the safety device 15 to an alarm device such as an air horn 29. Other alarm devices, such as an air-operated whistle, could be used in place of the horn.

Figure 2:
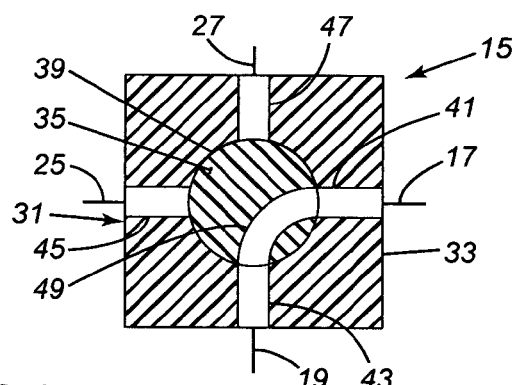
FIG. 2 is a schematic view of the safety device showing it in a first position allowing a driver to move the trailer with a tractor.

The safety device 15 has a valve 31 which has a casing 33 and a valve spool 35 rotatably mounted within the casing 33 as shown in FIG. 2. The casing 33 has a central cylindrical opening 39 therein for rotatably receiving the cylindrical valve spool 35. The casing 33 has an air inlet 41 for connection to the first brake line section 17; an air outlet 43 for connection to the second brake line section 19; a vent outlet 45 for connection to the air vent line 25; and an alarm outlet 47 for connection to the alarm line 27. The inlet 41 and the outlets 43, 45 and 47 connect to the cylindrical opening 39 in the casing 33. The valve spool 35 has a passageway 49 therethrough.

Figure 3:
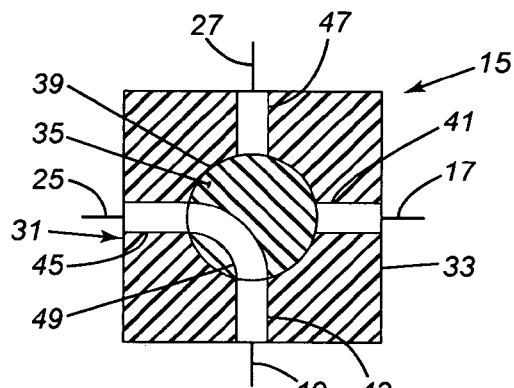
FIG. 3 is a schematic view of the safety device showing it in a second position preventing movement of the trailer.

The valve spool 35 of the valve 31 can be rotated within the casing 33 to a first or drive position, as shown in FIG. 2, where the first brake line section 17 is connected to the second brake line section 19 through the passageway 49 in the spool 35 to unlock the brakes so the trailer can be moved and the brakes can be operated normally. The vent and alarm lines 25, 27 are blocked by the spool in this position The valve spool 35 of the valve 31 can be rotated within the casing 33 to a second or locked position, as shown in FIG. 3, where the passageway 49 in the valve spool 35 connects the second brake line 19 to the air vent line 25 and the valve spool 35 closes the first brake line section 17. In this position the valve spool 35 directs air from the brakes 9 out of the second brake line section 19, through the passageway 49, to the air vent line 25 and out to the atmosphere, locking the brakes. The valve spool 35 also prevents air from the first brake line section 17 from reaching the brakes thereby preventing the trailer from moving. The alarm line 27 is also blocked by the valve spool.

Figure 4:
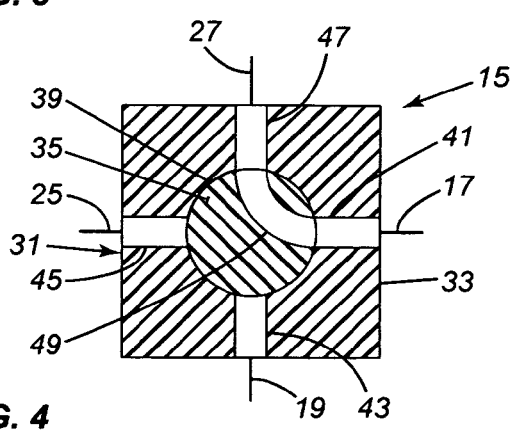
FIG. 4 is a schematic view of the safety device showing in an third position to sound an alarm if an unauthorized person tries to unlock the brakes and drive the trailer away.

The valve 35 can also be rotated to a third or alarm position, as shown in FIG. 4, where the passageway 49 in the valve spool 35 connects the first brake line section 17 to the alarm outlet 47 and thus to the alarm line 27. In this position, the valve 35 connects the air from the compressor 13 to an alarm device such as an air horn 29 instead of unlocking the brakes. The air vent line 25 is closed in this position, as is the second brake line section 19.

Figure 5:
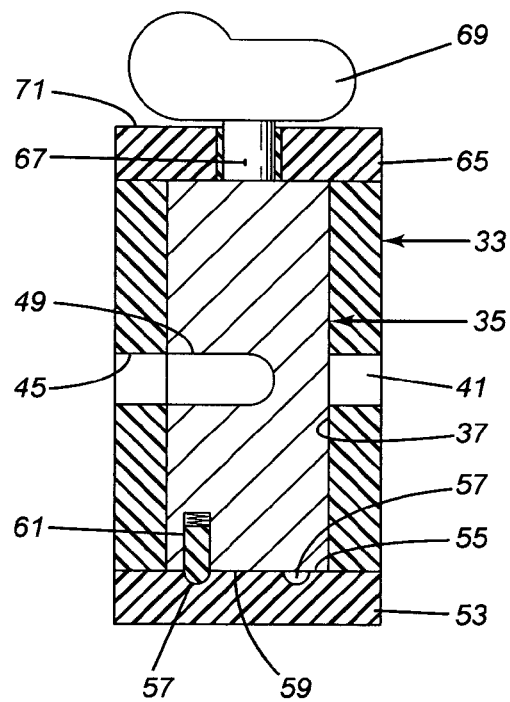
FIG. 5 is a cross-section view of the valve showing one way of locking the valve in selected operating positions.

In each of the three positions, the valve spool 35 can be locked to the casing 33, to prevent its inadvertent movement, by suitable known locking means. For example, as shown in FIG. 5, the casing 33 can have a first endplate 53 closing one end of the cylindrical opening 37, the inner surface 55 of the endplate having a recess 57 (only two shown) at each position of the spool. The circular end 59 of the spool 35 adjacent the inner surface of the first endplate 53 would carry a spring loaded detent 61 for entering any one of the three recesses 57 in the endplate 53 to lock the spool 35 at the position defined by the recess selected. As shown in FIG. 5, the detent 61 locks the spool 35 so the passageway 49 in the spool 35 connects the outlet opening 43 (not shown) in the casing 33 to the vent opening 45. The spool 35 also blocks the inlet opening 41. The other end of the opening 37 in the casing 33 can be closed by a second endplate 65 to retain the spool 35 in the opening 37. A shaft 67 can rotatably pass through the second endplate 65 to connect axially to the spool 35. A handle 69 on the other end of the shaft 67, adjacent the outer surface 71 of the second endplate 65, is used to rotate the spool as needed. While one type of locking means has been shown, other known locking means can be used.

In using the safety device 15, the workers coming into a trailer to unload it after its has been docked at an unloading dock would first turn the valve 31 to the second or locked position to prevent the driver from unlocking the brakes and moving the truck away while the workers are still loading or unloading it. After the trailer has been loaded or unloaded, the workers can move the valve 31 to the first or drive position to unlock the brakes so that the driver can safely drive the trailer away from the loading dock. If the truck is to be parked or left at the loading dock, with the trailer loaded, the valve 31 can be moved to the third or anti-theft position and the trailer is then closed to deny access to the valve. Now, if someone unauthorized tries to move the truck, the air horn will sound.

The safety device can have a cover (not shown) to enclose the valve and the cover can be locked to the wall of the trailer in the enclosing position with a padlock or other suitable lock to prevent access to the valve.

The invention claimed is:

1. A safety device for a trailer, the device having: a valve, the valve having a casing rotatably mounting a valve spool therein, the casing having an air inlet, an air outlet, a vent outlet, and an alarm outlet, separate from the air and vent outlets, therein; the valve spool having a single passageway therethrough; the air inlet connectable to a first brake line section from a compressor; the air outlet connectable to a second brake line section leading to brakes on the trailer; the vent outlet leading to the atmosphere; the alarm outlet connectable to an alarm line leading to an alarm on the trailer; the valve spool rotatable within the casing to any one of: a drive position where the valve connects the air inlet to the air outlet via the passageway to unlock the brakes and blocks the vent and alarm outlets; a locked position where the valve connects the air outlet to the vent outlet via the passageway to vent the brakes and leave the brakes locked and blocks the air inlet and alarm outlet; and an alarm position where the valve connects the air inlet to the alarm outlet via the passageway to sound the alarm when an attempt is made to move the trailer with a truck cab and blocks the vent and air outlets.

2. A safety device for a trailer as claimed in claim 1 wherein the valve of the safety device is mounted on the inside of a side wall of the truck trailer adjacent the back of the trailer.

3. A truck trailer having rear wheels; a braking system for the rear wheels having brakes for the wheels, a brake line for connecting to an air compressor, the air compressor mounted on one of the trailer or a truck tractor used to pull the trailer, the brake line connecting the air compressor to the brakes; a safety device inserted into the brake line, the safety device having a valve, the valve having a casing rotatably mounting a valve spool therein, the casing having an air inlet, an air outlet, a vent outlet, and an alarm outlet, separate from the air and vent outlets; the valve spool having a single passageway therethrough; the air inlet connectable to the part of the brake line coming from the compressor; the air outlet connectable to the part of the brake line going to brakes on the trailer; the vent outlet leading to the atmosphere; the alarm outlet connectable to an alarm line leading to an alarm; the valve spool rotatable within the casing to any one of: a drive position where the valve connects the air inlet to the air outlet via the spool passageway to unlock the brakes and blocks the vent and alarm outlets; a locked position where the valve connects the air outlet to the vent outlet via the spool passageway to vent the brakes and leave the brakes locked and blocks the air inlet and alarm outlet; and an alarm position where the valve connects the air inlet to the alarm outlet via the spool passageway to sound the alarm when an attempt is made to move the trailer with a truck tractor and blocks the vent and air outlets.

4. A truck trailer as claimed in claim 3 wherein the valve of the safety device is mounted on the inside of a side wall of the truck trailer adjacent the back of the trailer.

* * * * *